(12) United States Patent
Furukawa et al.

(10) Patent No.: US 7,244,685 B2
(45) Date of Patent: *Jul. 17, 2007

(54) SILICON CARBIDE POROUS BODY, PROCESS FOR PRODUCING THE SAME AND HONEYCOMB STRUCTURE

(75) Inventors: Masahiro Furukawa, Nagoya (JP); Nobuyuki Tanahashi, Nagoya (JP); Kenji Morimoto, Kasugai (JP); Shinji Kawasaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 78 days.

This patent is subject to a terminal disclaimer.

(21) Appl. No.: 10/535,213

(22) PCT Filed: Nov. 19, 2003

(86) PCT No.: PCT/JP03/14726

§ 371 (c)(1),
(2), (4) Date: May 17, 2005

(87) PCT Pub. No.: WO2004/046063

PCT Pub. Date: Jun. 3, 2004

(65) Prior Publication Data

US 2006/0029768 A1 Feb. 9, 2006

(30) Foreign Application Priority Data

Nov. 20, 2002 (JP) ............................. 2002-336142

(51) Int. Cl.
*C04B 35/565* (2006.01)

(52) U.S. Cl. .......................... 501/88; 501/89; 428/116; 264/630; 264/682

(58) Field of Classification Search ................ 428/116; 501/88, 89; 264/630, 682
See application file for complete search history.

(56) References Cited

U.S. PATENT DOCUMENTS

| 6,777,114 | B2 * | 8/2004 | Tomita et al. .............. 428/698 |
| 7,011,803 | B2 * | 3/2006 | Ichikawa et al. ........... 423/345 |
| 7,037,477 | B2 * | 5/2006 | Tomita et al. .............. 423/345 |
| 2005/0158534 | A1 * | 7/2005 | Tabuchi et al. .......... 428/304.4 |
| 2006/0121239 | A1 * | 6/2006 | Furukawa et al. .......... 428/116 |

FOREIGN PATENT DOCUMENTS

| JP | A 06-182228 | 7/1994 |
| JP | A-2002-154882 | 5/2002 |
| JP | A 2002-201082 | 7/2002 |
| WO | WO 02/081406 A1 | 10/2002 |

* cited by examiner

*Primary Examiner*—Karl Group
(74) *Attorney, Agent, or Firm*—Oliff & Berridge, PLC

(57) ABSTRACT

A silicon carbide porous body of the present invention, comprising silicon carbide particles and metallic silicon bonded together in such a manner that pores are retained between the silicon carbide particles and/or between the silicon carbide particle and metallic silicon, wherein an oxide phase containing oxides of silicon, aluminum, and alkaline earth metal is buried in at least some of fine pore portions having a minimum distance of 10 μm or less between the surfaces of the silicon carbide particles or between the surfaces of the silicon carbide particle and metallic silicon among the pores, and a ratio of a total volume of portions in which the oxide phase is not buried among the fine pore portions is 20% or less with respect to a total volume of portions in which the oxide phase is not buried among the pores including the fine pore portions.

13 Claims, 3 Drawing Sheets

SILICON CARBIDE POROUS BODY, PROCESS FOR PRODUCING THE SAME AND HONEYCOMB STRUCTURE

TECHNICAL FIELD

The present invention relates to a silicon carbide porous body, a process for producing the same, and a honeycomb structure. In more detail, the present invention relates to a silicon carbide porous body having high mechanical strength and preferably usable, for example, as a material constituting a filter, a catalyst carrier or the like for automobile exhaust gas purification, a process for producing the same, and a honeycomb structure comprising the silicon carbide porous body.

BACKGROUND ART

A porous honeycomb structure has been broadly used as a filter (diesel particulate filter (DPF)) for capturing/removing particulate matters included a soot-containing fluid such as a diesel engine exhaust gas, or a catalyst carrier for carrying catalyst components to purify toxic substances in the exhaust gas. The honeycomb structure comprises: cell partition walls (ribs) forming a composite body of a plurality of adjacent cells; and a honeycomb outer wall which surrounds and holds outermost peripheral cells positioned in an outermost periphery of this cell composite body. A silicon carbide porous body using fire-resistant silicon carbide particles as aggregates has been used as a material constituting the structure.

As the honeycomb structure, for example, a honeycomb-structure porous silicon carbide catalyst carrier has been described which is obtained using impurity-containing silicon carbide having a predetermined specific surface area as a starting material. The material is formed into a desired shape, dried, and thereafter fired in a temperature range of 1600 to 2200° C. (see, e.g., JP-A-6-182228).

In a sintered configuration (necking) by recrystallization reaction of silicon carbide particles themselves in the catalyst carrier described in JP-A-6-182228, silicon carbide components evaporate from the surfaces of the silicon carbide particles, and condense on each contact portion (neck portion) between the particles, and accordingly the bonded state is attained due to the grow of the neck portions. However, since very high firing temperature is required for evaporating silicon carbide, cost increase is brought. Moreover, since a material having a high coefficient of thermal expansion has to be fired at high temperature, there has been a disadvantage that the yield after firing drops.

Moreover, to produce a filter having a high porosity, especially a filter having a porosity of 50% or more by the above-described sintering by the recrystallization reaction of the silicon carbide particles themselves, a sintering mechanism does not sufficiently function, therefore the growths of the neck portions are inhibited, and accordingly there has been a disadvantage that strength of the filter drops.

As a conventional technique for solving these problems, there have been disclosed a porous honeycomb structure containing fire-resistant particles which are aggregates, especially silicon carbide and metallic silicon, and a process for producing the structure (see, e.g., JP-A-2002-201082). According to the producing process, a porous honeycomb structure can be inexpensively produced at a comparatively low firing temperature, and the obtained porous honeycomb structure has characteristics of being comparatively high in porosity, and high in thermal conductivity and strength.

At present, as to the above-described DPF, it is one of important problems to reduce as much as possible pressure losses which largely influence engine outputs. To attain this theme, it is required to have a DPF of increased porosity; that is, a material having a higher porosity be used as a porous material constituting the filter. There is under development a DPF being provided with a regeneration system in which an oxidation catalyst is loaded on a conventional DPF (DPF for catalyst regeneration), and can oxidize to burn deposited particulates for continuously regeneration.

Especially, as to the DPF for regeneration the catalyst, it is required to reduce the pressure loss of the filter as much as possible, and also required to make the porosity higher, concretely 50% or more, and especially around 70%.

However, when the porosity of the silicon carbide porous body is raised, the strength accordingly drops. At a porosity of a certain or more degree, for example, at a porosity of 60% or more, for example, there has been a problem that it is difficult to preferably use the porous body as a material constituting a filter, a catalyst carrier or the like for automobile exhaust gas purification.

DISCLOSURE OF THE INVENTION

The present invention has been developed in view of the problems associated with the above-described conventional technique, and an object thereof is to provide a silicon carbide porous body having high mechanical strength and preferably usable, for example, as a material constituting a filter, a catalyst carrier or the like for automobile exhaust gas purification, a process for producing the same, and a honeycomb structure comprising the silicon carbide porous body.

To achieve the above-described object, the present invention is to provide the following silicon carbide porous body, a process for producing the same, and a honeycomb structure.

[1] A silicon carbide porous body comprising silicon carbide particles which are aggregates and metallic silicon which is a bonding material, bonded together in such a manner that pores are retained between the silicon carbide particles and/or between the silicon carbide particle and metallic silicon, characterized in that an amorphous oxide phase containing oxides of silicon, aluminum, and strontium ($SrO:Al_2O_3:SiO_2$) in a ratio of (1.0:0.1:1.0) to (1.0:1.0:3.0) in terms of amount ratio (molar ratio) of each substance is buried in at least some of fine pore portions having a minimum distance of 10 μm or less between the surfaces of the silicon carbide particles or between the surfaces of the silicon carbide particle and metallic silicon among the pores, and a ratio of a total volume (pore volume of the fine pore portion) of portions in which the oxide phase is not buried among the fine pore portions is 20% or less with respect to a total volume (total pore volume) of portions in which the oxide phase is not buried among the pores including the fine pore portions.

[2] The silicon carbide porous body according to the above [1], wherein a plane image obtained by photographing a cut face of the silicon carbide porous body cut with a predetermined plane is subjected to an image analysis process, and divided into a specified pore portion originating from the portion in which the oxide phase is not buried in the pore including the fine pore portion, a specified silicon carbide particle portion originating from the silicon carbide particle, a specified metallic silicon portion originating from metallic silicon, and a specified oxide phase portion originating from the oxide phase, and a relation of the following equation (1) is satisfied by a total length (contact length) L (mm/mm$^2$) per unit area (1 mm$^2$) of a portion with which the silicon carbide particle portion, the metallic silicon portion, and the oxide phase portion are brought into contact on the divided plane image, and a porosity $\epsilon$ (%) of the silicon carbide porous body:

$$L \geq -1.0\epsilon + 90 \quad (1).$$

[3] The silicon carbide porous body according to the above [1] or [2], wherein a ratio of a total area of portions with which the silicon carbide particle and the oxide phase are brought into contact is in a range of 10 to 70% with respect to a total area of portions with which the silicon carbide particle, metallic silicon, and oxide phase are brought into contact.

[4] The silicon carbide porous body according to the above [3], wherein the ratio of the total area of the portions with which the silicon carbide particle and the oxide phase are brought into contact is in a range of 25 to 50% with respect to the total area of the portions with which the silicon carbide particle, metallic silicon, and oxide phase are brought into contact.

[5] The silicon carbide porous body according to the above [1], wherein melting temperatures of the oxides (SrO, Al$_2$O$_3$, SiO$_2$) are in a range of 1000 to 1400° C.

[6] The silicon carbide porous body according to the above [5], wherein melting viscosity of the oxide phase is lower than that of metallic silicon.

[7] The silicon carbide porous body according to the above [5] or [6], wherein a ratio of mass of the oxide phase is in a range of 1.0 to 10.0 mass % with respect to a total mass of the silicon carbide particle and metallic silicon.

[8] The silicon carbide porous body according to the above [7], wherein a ratio of mass of the oxide phase is in a range of 4.0 to 8.0 mass % with respect to a total mass of the silicon carbide particle and metallic silicon.

[9] A honeycomb structure comprising: the silicon carbide porous body according to any one of the above [1] to [8].

[10] A process for producing a silicon carbide porous body, characterized by: adding, to silicon carbide particles and metallic silicon, compound containing strontium, aluminum, and silicon in a range of 1.0 to 10.0 parts by mass in terms of oxides (SrO, Al$_2$O$_3$, SiO$_2$) with respect to a total of 100 parts by mass of the silicon carbide particles and metallic silicon and silicon in a range of 1.0 to 10.0 parts by mass in terms of oxides (SrO, Al$_2$O$_3$, SiO$_2$) with respect to a total of 100 parts by mass of the silicon carbide particles and metallic silicon by adjusting a type and/or an adding amount of the compound containing strontium, aluminum, and silicon in such a manner that a content ratio (SrO:Al$_2$O$_3$:SiO$_2$) of the oxides of strontium, aluminum, and silicon being contained in an amorphous oxide phase constituting at least a part of the porous body having the porous structure obtained by the firing is in a range of (1.0:0.1:1.0) to (1.0:1.0:3.0) in each substance amount ratio (molar ratio) to obtain a raw material; forming the obtained raw material into a predetermined shape to obtain a formed article; degreasing and thereafter firing the obtained formed article; and burying an oxide phase containing the respective oxides of silicon, aluminum, and alkaline earth metal in at least some of fine pore portions having a minimum distance of 10 μm or less between the surfaces of the respective silicon carbide particles or between the surfaces of the silicon carbide particle and metallic silicon among the pores formed between the silicon carbide particles in such a manner that a ratio of a total volume (pore volume of the fine pore portion) of portions in which the oxide phase is not buried among the fine pore portions is 20% or less with respect to a total volume (total pore volume) of portions in which the oxide phase is not buried among the pores including the fine pore portions to obtain the porous body having a porous structure.

[11] The process for producing the silicon carbide porous body according to the above [12] or [13], wherein an amount of the compound to be added to the silicon carbide particles and metallic silicon and containing strontium, aluminum, and silicon, converted into the respective oxides (SrO, Al$_2$O$_3$, SiO$_2$), is set to a range of 4.0 to 8.0 parts by mass with respect to a total amount of 100 parts by mass of the silicon carbide particles and metallic silicon.

BEST MODE FOR CARRYING OUT THE INVENTION

Modes for carrying out a silicon carbide porous body, a process for producing the same, and a honeycomb structure of the present invention will be described hereinafter specifically with reference to the drawings.

Figure 1:
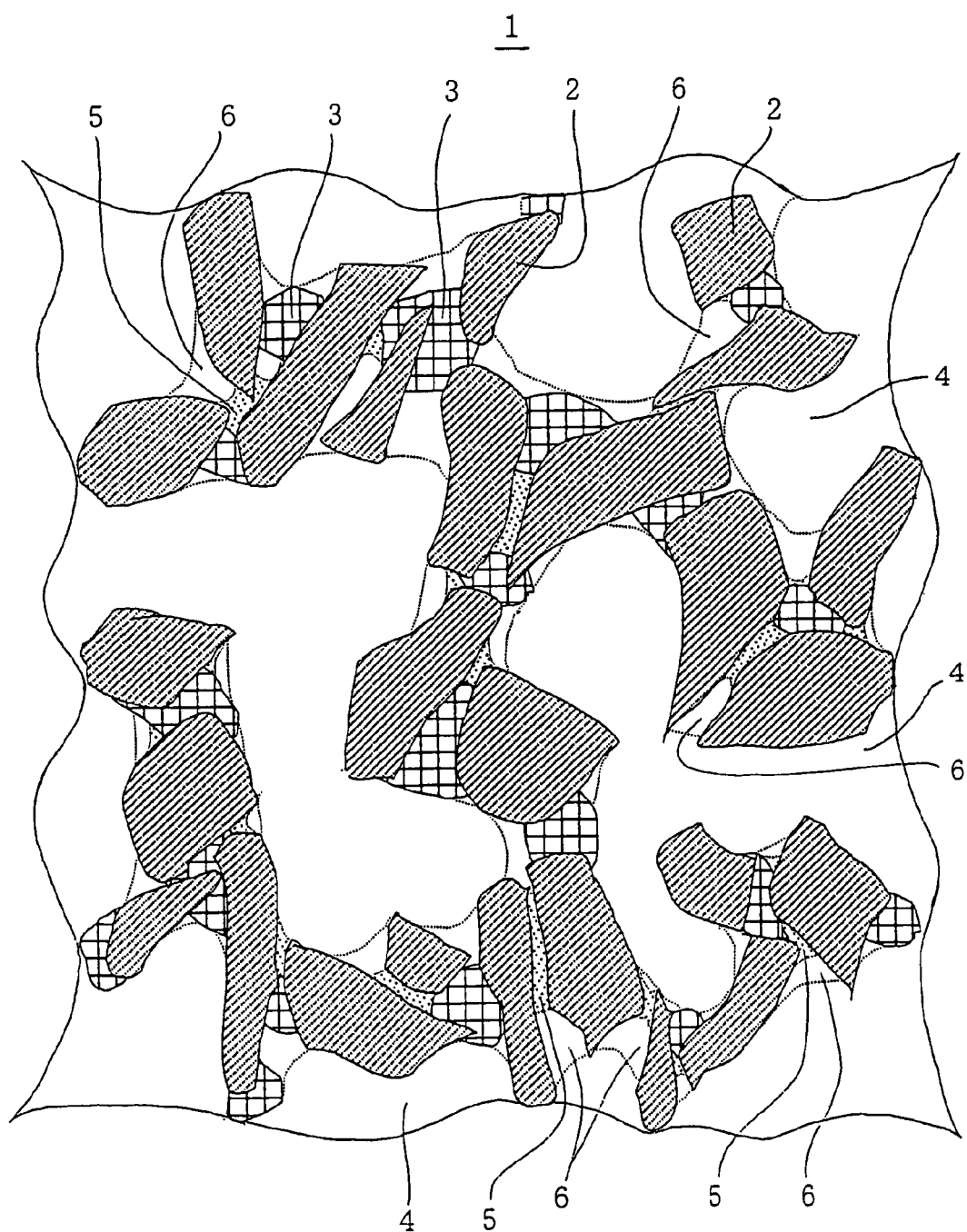
FIG. 1 is a sectional view schematically showing one embodiment of a silicon carbide porous body of the present invention.

First, one embodiment of the silicon carbide porous body of the present invention will be described with reference to FIG. 1. FIG. 1 is a sectional view schematically showing a silicon carbide porous body of the present embodiment.

As shown in FIG. 1, in a silicon carbide porous body 1 of the present embodiment, silicon carbide particles 2 which are aggregates are bonded to metallic silicon 3 which is a bonding material in a state in which pores 4 are held between the silicon carbide particles 2, and/or between the silicon carbide particle 2 and metallic silicon 3 to constitute the silicon carbide porous body 1. Oxide phases 5 containing oxides of silicon, aluminum, and alkaline earth metal are buried in at least some of fine pore portions 6 having a minimum distance of 10 μm or less between the surfaces of the silicon carbide particles 2, or between the surface of the silicon carbide particle 2 and that of metallic silicon 3 among the pores 4. A ratio of a total (pore volumes of fine pore portions) of volumes of portions in which any oxide phase 5 is not buried among the fine pore portions 6 is 20% or less with respect to a total (total pore volume) of volumes of portions in which any oxide phase 5 is not buried among the pores 4 including the fine pore portions 6.

In general, a mechanical strength tends to drop in the porous body whose porosity has been raised, but as described above, in the silicon carbide porous body 1 of the present embodiment, in addition to the bonding by metallic silicon 3, the oxide phase 5 is buried to thereby thicken bonding between the silicon carbide particles 2 and/or between the silicon carbide particle 2 and metallic silicon 3, and the bonding is further secured. Consequently, the mechanical strength of the silicon carbide porous body 1 can be raised, and the porous body is preferably usable, for example, as a material constituting a filter, a catalyst carrier or the like for automobile exhaust gas purification. The material can be sintered at a comparatively low firing temperature during production, producing costs are reduced, and producing yield is enhanced.

As described above, in the silicon carbide porous body 1, the silicon carbide particles 2 which are the aggregates are bonded to metallic silicon 3 which is the bonding material in a state in which the pores 4 are retained between the silicon carbide particles 2 and/or between the silicon carbide particle 2 and metallic silicon 3. Among the pores 4, portions having a minimum distance of 10 μm or less between the surfaces of the silicon carbide particles 2, or between the surfaces of the silicon carbide particle 2 and metallic silicon 3 are the fine pore portions 6. In the present embodiment, the oxide phases 5 are buried at least some of the fine pore portions 6. It is to be noted that the oxide phase 5 may be buried in such a manner as to seal all the fine pore portions 6.

A volume of the portion in which any oxide phase 5 is not buried in the pore 4 including the above-described fine pore portion 6, and that of the portion in which any oxide phase 5 is buried in the fine pore portion 6 can be calculated from a pore diameter distribution measured, for example, using a mercury porosimeter or the like. The section of the silicon carbide porous body 1 is photographed by a scanning electron microscope (SEM) or the like, and images photographed in a plurality of sections are analyzed. The volumes may be calculated as integrated values.

Moreover, in the present embodiment, in a case where a total of lengths of portions with which the silicon carbide particle 2, metallic silicon 3, and oxide phase 5 are brought into contact per unit area (1 mm$^2$) is "contact length L (mm/mm$^2$)", porosity $\epsilon$ (%) of the silicon carbide porous body 1, and the above-described contact length L (mm/mm$^2$) preferably satisfy a relation of the following equation (1):

$$L \geq -1.0\epsilon + 90 \qquad (1).$$

The above-described equation (1) is an evaluation method in which strength of bonding between the silicon carbide particles 2 is judged in a predetermined porosity. When the porosity $\epsilon$ (%) and the contact length L (mm/mm$^2$) satisfy the relation of the above-described equation (1), it can be judged that the silicon carbide porous body 1 has a superior strength as the constituting material of a DPF. Specifically, the silicon carbide porous body 1 constituting a sample is cut to obtain a predetermined cut face. At this time, to form the cut face into a uniformly flat face, the cut face may be appropriately polished. A plane image obtained by photographing the cut face using the scanning electron microscope (SEM) or the like is taken into a calculator including a personal computer (PC) using image take-in means such as a scanner. By a predetermined image analyzing method, the taken-in plane image is divided and extracted as a specified silicon carbide particle portion originating from the silicon carbide particle 2, a specified metallic silicon portion originating from metallic silicon 3, a specified oxide phase portion originating from the oxide phase 6, and a specified portion (pore portion) originating from a portion in which any oxide phase 6 is not buried in the pore 4 including the fine pore portion 6. When a predetermined image processing method is applied to a boundary among the extracted silicon carbide particle 2 (silicon carbide particle portion), metallic silicon 3 (metallic silicon portion), and oxide phase 5 (oxide phase portion), a boundary line having a width for one pixel is extracted, and the total of the length per unit area (1 mm$^2$) is assumed as the contact length L (mm/mm$^2$).

Moreover, in the present embodiment, a ratio of a total area of portions with which the silicon carbide particle 2 and the oxide phase 5 are brought into contact is preferably 10 to 70% with respect to a total area of portions with which the silicon carbide particle 2, metallic silicon 3, and oxide phase 5 are brought into contact. When the ratio of the area of the portions with which the silicon carbide particle 2 and oxide phase 5 are brought into contact is less than 10%, the mechanical strength of the silicon carbide porous body 1 cannot be sufficiently raised in some case. When the ratio of the area of the portion with which the silicon carbide particle 2 and oxide phase 5 are brought into contact exceeds 70%, there is fear that the silicon carbide particle 2 is brought into contact with metallic silicon 3 insufficiently, and thermal conductivity drops. It is to be noted that a total area of the portions with which the silicon carbide particle 2, metallic silicon 3, and oxide phase 5 are brought into contact, and a total area of the portions with which the silicon carbide particle 2 and oxide phase 5 are brought into contact can be calculated as integrated values. For example, a polished face of the silicon carbide porous body 1 is photographed using the scanning electron microscope (SEM) or the like, and images photographed in a plurality of sections in a thickness direction are subjected to computer image analysis. A length (interface length) of the boundary line is extracted using an image analysis method similar to an evaluation method in which bonding strength is judged between the silicon carbide particles 2 in the above-described predetermined porosity, and the length is approximately usable. It is to be noted that from a viewpoint that the silicon carbide porous body 1 be obtained having high thermal conductivity and mechanical strength, the ratio of the total area of the portions with which the silicon carbide particle 2 and the oxide phase 5 are brought into contact is preferably 25 to 50% with respect to the total area of the portions with which the silicon carbide particle 2, metallic silicon 3, and oxide phase 5 are brought into contact.

In the present embodiment, it is required that the oxide phase 5 is amorphous, the oxide phase 5 contains all oxides (SrO, $Al_2O_3$, $SiO_2$) of strontium, aluminum, and silicon, and a content ratio (SrO:$Al_2O_3$:$SiO_2$) of the respective oxides of strontium, aluminum, and silicon in the oxide phase 5 is (1.0:0.1:1.0) to (1.0:1.0:3.0) in accordance with each substance amount ratio (molar ratio).

By this constitution, the respective oxides are regarded as a ternary compound system, and an eutectic point is lowered. Accordingly, during firing, an oxide film is easily molten/removed with which the surface of the silicon carbide particle 2 and/or metallic silicon 3 is coated to obtain satisfactory wettability of metallic silicon 3, and a bonding portion for mutually bonding the silicon carbide particles 2 can further be thickened. It is to be noted that the oxide film with which the surface of the silicon carbide particle 2 and/or metallic silicon 3 is coated is $SiO_2$ or the like. Furthermore, when the eutectic point is lowered, viscosity of the oxide phase 5 can be lowered. Therefore, the oxide phase 5 can be buried in the fine pore portion 6 of the pore 4 in which metallic silicon 3 cannot be buried, and the mechanical strength of the silicon carbide porous body 1 can be enhanced in order to assist the bonding between the silicon carbide particles 2 by metallic silicon 3.

When a substance amount ratio (molar ratio) of the oxide of aluminum ($Al_2O_3$) is less than 0.1 in the above-described substance amount ratio (molar ratio), wettability of metallic silicon 3 (Si) drops, and the mutual bonding between the silicon carbide particles 2 sometimes weakens. Strontium silicate ($SrSiO_3$) is sometimes generated by strontium oxide (SrO) and silicon dioxide ($SiO_2$) contained in the oxide phase 5. Since strontium silicate easily melts in acetic acid or the like for use in carrying catalyst in a case where the silicon carbide porous body 1 is used as a catalyst carrier or the like, a problem is assumed to occur that the oxide phase 5 is eluted in carrying the catalyst and the strength drops. When the substance amount ratio (molar ratio) of oxide ($Al_2O_3$) of aluminum exceeds 1.0, a hardly soluble film is formed on the surface of metallic silicon 3, and the wettability between the silicon carbide particle 2 and metallic silicon 3 is deteriorated to lower the strength in some case. When the substance amount ratio (molar ratio) of oxide ($SiO_2$) of silicon is less than 1.0, or exceeds 3.0, the above-described eutectic point does not sufficiently drop, and the mechanical strength of the silicon carbide porous body 1 cannot be sufficiently effectively enhanced in some case.

The above-described "content ratio of the respective oxides of strontium, aluminum, and silicon in the oxide phase 5" can be calculated from values of Al, Ca and the like contained as impurities in the added compound and metallic silicon in terms of oxides, and a value of an amount of silicon dioxide ($SiO_2$) contained in the oxide film of the surface of the silicon carbide particle 2 and/or metallic silicon 3 in terms of an oxygen amount obtained by chemical analysis of a material powder.

In the present embodiment, melting temperatures of the above-described oxides (SrO, $Al_2O_3$, $SiO_2$) are preferably 1000 to 1400° C. When the melting temperature is less than 1000° C., the viscosity of the oxide phase 5 excessively drops, and therefore the oxide phase 5 sometimes deviates in the silicon carbide porous body 1. When the melting temperature exceeds 1400° C., the viscosity of the oxide phase 5 does not sufficiently drop, and the oxide phase 5 does not easily enter the fine pore portion 6 of the pore 4 in some case.

Moreover, in the present embodiment, melting viscosity of the oxide phase 5 is preferably lower than that of metallic silicon 3. By this constitution, the oxide phase 5 more easily enters the fine pore portion 6 of the pore 4 of the silicon carbide porous body 1.

Furthermore, in the present embodiment, a ratio of mass of the oxide phase 5 is preferably 1.0 to 10.0 mass % with respect to a total mass of the silicon carbide particle 2 and metallic silicon 3. When the mass ratio of the oxide phase 5 is less than 1.0 mass %, the strength of the silicon carbide porous body 1 cannot be sufficiently effectively enhanced. When the mass ratio of the oxide phase 5 exceeds 10.0 mass %, the amount of the oxide phase 5 is excessively large, therefore firing contraction is large, and the porosity of the silicon carbide porous body 1 drops. For example, when the porous body is used as a filter such as DPF, pressure loss excessively increases in some case. It is to be noted that from a viewpoint of the silicon carbide porous body 1 having high porosity and mechanical strength, a ratio of mass of the oxide phase 5 is further preferably 4.0 to 8.0 mass % with respect to a total mass of the silicon carbide particle 2 and metallic silicon 3.

Next, one embodiment of a honeycomb structure of the present invention will be described. The honeycomb structure of the present embodiment comprises the silicon carbide porous body 1 (see FIG. 1) described above. The honeycomb structure of the present embodiment reflects characteristics of the silicon carbide porous body 1 (see FIG. 1) which is a constituting material, and has superior resistances to oxidation, acid, particulate reaction, and thermal shock. Furthermore, the honeycomb structure of the present embodiment is usable as a DPF, a DPF for regeneration by catalyst, catalyst carrier or the like under a high space velocity (SV) condition.

Next, one embodiment of a process for producing the silicon carbide porous body of the present invention will be specifically described.

In the process for producing the silicon carbide porous body of the present embodiment, first, 1.0 to 10.0 parts by mass of compound containing strontium, aluminum, and silicon are added to silicon carbide particles and metallic silicon in terms of oxides (SrO, $Al_2O_3$, $SiO_2$) with respect to a total amount of 100 parts by mass of the silicon carbide particles and metallic silicon to obtain a raw material. It is to be noted that, in the present invention, the compound containing strontium, aluminum, and silicon may contain only one type of alkaline earth metals (Mg, Ca, Sr, Ba) including strontium, aluminum, and silicon, or may contain a plurality of types. During the adding, only one type of compound containing strontium, aluminum, and silicon may be added, or a plurality of types may be added in such a manner that the finally formed oxide phase contains strontium as at least one type of the alkaline earth metals, aluminum, and silicon. When a plurality of types is added, the added amounts may be mutually different or equal. In this case, a forming auxiliary agent such as an organic binder may be added if necessary. It is to be noted that the silicon carbide particle or metallic silicon sometimes contains a micro amount of impurities such as iron, aluminum, and calcium, but may be simply used, or may be subjected to chemical treatment such as chemical cleaning and refined for use. When an amount of compound to be added is less than 1.0 part bymass in terms of the respective oxides (SrO, $Al_2O_3$, $SiO_2$), the strength of the obtained silicon carbide porous body cannot be sufficiently effectively enhanced. When the amount exceeds 10.0 parts by mass, the amount of the oxide phase formed by the compound is excessively large, therefore the firing contraction increases, and the porosity of the obtained silicon carbide porous body drops. For example, when the porous body is used as the filter like the DPF, the pressure loss excessively increases. Strontium contained in the compound is preferably contained in the form of strontium oxide (SrO) or strontium carbonate ($SrCO_3$) because the oxide phase can be efficiently formed, and the substance is easily obtainable & capable of handling easily. Similarly, aluminum is preferably contained in the form of aluminum oxide ($Al_2O_3$) or metallic aluminum. It is to be noted that, in this case, metallic aluminum may be contained as impurities of metallic silicon. Similarly, silicon is preferably contained in the form of silicon dioxide ($SiO_2$) or colloidal silica. It is to be noted that, in this case, silicon dioxide may be contained as an oxide film ($SiO_2$) with which the surface of the silicon carbide particle and/or metallic silicon is to be coated.

Next, the raw materials obtained in this manner are mixed and kneaded to constitute a clay for forming, this clay is formed into a predetermined shape such as a honeycomb shape, this clay is calcined, and the organic binder is degreased to obtain a formed article.

Next, the obtained formed article is fired, and an oxide phase containing the respective oxides of silicon, aluminum, and alkaline earth metal is buried in at least some of pores formed between the silicon carbide particles in such a manner that a ratio of a total volume (pore volume of the fine pore portion) of portions in which the oxide phase is not buried among the fine pore portions is 20% or less with respect to a total volume (total pore volume) of portions in which the oxide phase is not buried among the pores including the fine pore portions to obtain the porous body having a porous structure.

In the producing process of the present embodiment, it is required to adjust a type and/or an adding amount of the compound containing strontium, aluminum, and silicon in such a manner that a content ratio ($SrO:Al_2O_3:SiO_2$) of the oxides of strontium, aluminum, and silicon is (1.0:0.1:1.0) to (1.0:1.0:3.0) in each substance amount ratio (molar ratio), the oxides being contained in the oxide phase constituting the porous body having the porous structure obtained by the firing.

The compound containing strontium, aluminum, and silicon, which has been added as the raw material, is decomposed or oxidized, and molten at the firing time. In this case, the molten oxides of strontium, aluminum, and silicon are regarded as a ternary compound system, the eutectic point is lowered, and further viscosity is lowered. Accordingly, the oxide film on the surface of the silicon carbide particle and/or metallic silicon is molten/removed, the wettability of metallic silicon for bonding the silicon carbide particles is set to be satisfactory, and a bonding portion bonded to the silicon carbide particle can further be thickened. Since the viscosity of a surplus oxide phase drops, the phase easily enters the pores of the porous body, especially the fine pore portion having a small pore diameter. Since the phase solidifies in this state to aid the mutual bonding among the silicon carbide particles, the mechanical strength rises.

It is to be noted that from a viewpoint of the producing of the silicon carbide porous body having high porosity and mechanical strength, in the present embodiment, amount of the compound to be added to the silicon carbide particles and metallic silicon and containing strontium, aluminum, and silicon, converted into the respective oxides ($SrO$, $Al_2O_3$, $SiO_2$), is further preferably set to a range of 4.0 to 8.0 parts by mass with respect to a total amount of 100 parts by mass of the silicon carbide particles and metallic silicon.

It is to be noted that, in the present embodiment, calcining is preferably performed at a temperature lower than that at which metallic silicon melts. Specifically, a predetermined temperature may be once held at about 150 to 700° C., or a temperature rise speed may be delayed to 50° C./hr in a predetermined temperature range in performing the calcining. As to a method of holding once at the predetermined temperature, a temperature level only or a plurality of temperature levels may be held depending on a type and amount of the used organic binder. Furthermore, in a case where the plurality of temperature levels are held, holding times may be equal to or different from one another. Similarly, as to a method of slowing the temperature rise speed, the speed may be decreased only in one temperature segment or a plurality of segments. Further in a plurality of segments, the speeds may be equal to or different from one another.

To obtain a porous structure in which the silicon carbide particles are bonded by metallic silicon, metallic silicon needs to be softened at the firing time. Since melting point of metallic silicon is 1410° C., the firing temperature during the firing is preferably set to 1410° C. or more. Furthermore, optimum firing temperature is determined by a micro structure or a characteristic value. However, since evaporation of metallic silicon proceeds at a temperature exceeding 1600° C., and the bonding via metallic silicon is difficult, the firing temperature is appropriately 1410 to 1600° C., preferably 1420 to 1580° C.

EXAMPLES

The present invention will be described hereinafter specifically in accordance with examples, but the present invention is not limited to these examples.

Examples 1 and 2, Comparative Examples 1 to 6

Silicon carbide particles having an average particle diameter of 33 µm, and powder of metallic silicon having an average particle diameter of 5 µm were blended in such a manner as to obtain a composition of 80:20 in a mass ratio, and a compound containing strontium oxide ($SrO$), aluminum oxide ($Al_2O_3$), and silicon dioxide ($SiO_2$) was added to obtain a raw material. To this raw material, 6 parts by mass of methyl cellulose, 2.5 parts by mass of surfactant, and 24 parts by mass of water were added as organic binders with respect to a total amount of 100 parts by mass of silicon carbide particles and metallic silicon, and the material was uniformly mixed and kneaded to obtain a forming clay. The obtained clay was formed into a honeycomb shape having an outer diameter of 45 mm, length of 120 mm, partition wall thickness of 0.43 mm, and cell density of 100 cells/square inch (16 cells/cm$^2$) by an extruder. Next, after performing calcining at 500° C. for 5 hours for degreasing, firing was performed in a non-oxidizing atmosphere at 1450° C. for two hours to prepare a honeycomb-structure silicon carbide porous body. In the obtained silicon carbide porous body, silicon carbide particles and metallic silicon were bonded in a state in which pores were retained between the silicon carbide particles and/or between the silicon carbide particle and metallic silicon. An oxide phase containing oxides of silicon, aluminum, and atmosphere was buried in at least some of fine pore portions having a minimum distance of 10 µm or less between the surfaces of the silicon carbide particles, or between the surfaces of the silicon carbide particle and metallic silicon among the pores.

Example 3 and Comparative Example 7

Honeycomb-structure silicon carbide porous bodies (Example 3 and Comparative Example 7) were prepared by operations similar to those of Examples 1 and 2, Comparative Examples 1 to 6 described above except that 10 parts by mass of foaming resin (acrylonitrile-based plastic balloons (average particle diameter of 50 µm)), and 15 parts by mass of organic pore former (starch (average particle diameter of 50 µm)) were added in addition to a compound containing strontium oxide ($SrO$) which was an alkaline earth metal, aluminum oxide ($Al_2O_3$), and silicon dioxide ($SiO_2$).

As to the respective prepared silicon carbide porous bodies (Examples 1 to 3, Comparative Examples 1 and 7), a ratio (%) (hereinafter referred to sometimes as micro porosity (%)) of a total volume (pore volume of fine pore portion) of portions (having pre diameters of 10 µm or less) was calculated in which any oxide phase was not buried among the fine pore portions having a minimum distance of 10 µm or less between the surfaces of the silicon carbide particles, or between the surfaces of the silicon carbide particle and metallic silicon, with respect to a total volume (total pore volume) of portions in which any oxide phase was not buried among pores including the above-described fine pore portions, using a pore diameter distribution measured by a mercury porosimeter. Results are shown in Table 1.

TABLE 1

| | Substance amount (mol %) ratio of oxides (SrO:Al$_2$O$_3$:SiO$_2$) | Ratio of mass of oxide phase (mass %) | Micro porosity (%) | Contact length (mm/mm$^2$) | Oxide bonding ratio (%) | Porosity (%) | Strength (MPa) |
|---|---|---|---|---|---|---|---|
| Example 1 | 1.0:0.2:2.0 | 1.7 | 17 | 46 | 11 | 45 | 25 |
| Example 2 | 1.0:0.2:1.3 | 4.1 | 8 | 59 | 35 | 44 | 40 |
| Example 3 | 1.0:0.2:2.1 | 5.8 | 9 | 48 | 38 | 59 | 18 |
| Comparative Example 1 | 1.0:0.2:1.0 | 0.8 | 24 | 32 | 5 | 45 | 15 |
| Comparative Example 2 | 1.0:0.2:2.0 | 15 | — | — | — | 32 | — |
| Comparative Example 3 | 1.0:0.06:2.0 | 1.6 | — | — | — | 45 | — |
| Comparative Example 4 | 1.0:1.2:2.0 | 2.4 | — | — | — | 44 | 18 |
| Comparative Example 5 | 1.0:0.2:0.5 | 1.6 | — | — | — | 45 | 16 |
| Comparative Example 6 | 1.0:0.2:5.0 | 2.2 | — | — | — | 45 | 18 |
| Comparative Example 7 | 1.0:0.2:1.0 | 0.8 | 26 | 18 | 5 | 60 | 9 |

Moreover, ratios were calculated: each substance amount ratio (molar ratio) (SrO:Al$_2$O$_3$:SiO$_2$) of oxides of strontium, aluminum, and silicon in the oxide phase constituting each prepared silicon carbide porous body; and a ratio (mass %) (hereinafter referred to simply as the ratio (mass %) of the mass of the oxide phase in some case) of the mass of the oxide phase with respect to a total mass of the silicon carbide particles which were aggregates and metallic silicon which was a bonding material. The ratios were calculated from an added compound and a compound contained as impurities in the silicon carbide particles or silicon carbide particle material. Results are shown in Table 1. These values may be calculated, when measuring and quantifying a characteristic X-ray inherent in each element (Sr, Al, Si, O) by EDS point analysis in the oxide phase existing in a polished face of the prepared silicon carbide porous body. Alternatively, the values may be calculated by quantification by predetermined chemical analysis or the like, but the measuring method is not limited to the above-described method.

(Image Analysis)

Figure 2:
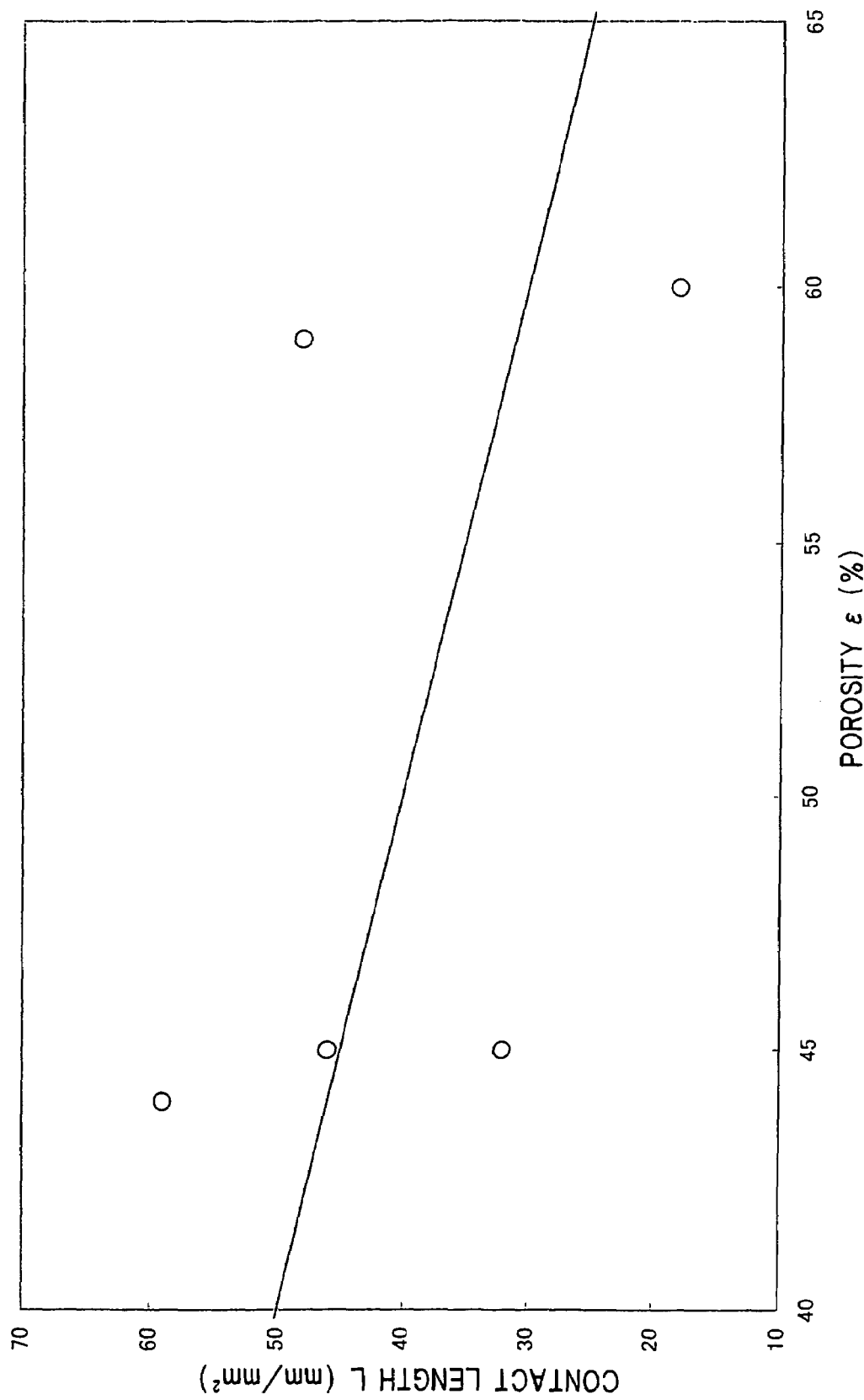
FIG. 2 is a graph in which a contact length L (mm/mm$^2$) is plotted with respect to a value of a porosity $\epsilon$ (%) in the silicon carbide porous body of an example of the present invention.

An image of each silicon carbide porous body was analyzed using application (Image-Pro Plus (trade name) (manufactured by MEDIA CYBERNETICS Co.) for image analysis. Specifically, first the silicon carbide porous body constituting a sample was cut to obtain a predetermined cut face. At this time, to form the cut face into a uniformly flat face, the cut face may be appropriately polished. A plane image obtained by photographing the cut face using the scanning electron microscope (SEM) or the like was taken into a calculator including a personal computer (PC) using image take-in means such as a scanner. By a predetermined image analyzing method, the taken-in plane image was divided and extracted as the silicon carbide particle 2, metallic silicon 3, oxide phase 5, and portion (pore portion) in which any oxide phase 5 was not buried in the pore 4 including the fine pore portion 6 as shown in FIG. 1. When a predetermined image processing method was applied to a boundary among the extracted silicon carbide particle 2, metallic silicon 3, and oxide phase 5, a boundary line having a width for one pixel was extracted, and the total of the lengths per unit area (1 mm$^2$) was calculated as the contact length L (mm/mm$^2$). Obtained results are shown in Table 1. A graph in which the contact length L (mm/mm$^2$) is plotted with respect to the value of the porosity ε (%) is shown in FIG. 2. It is to be noted that a straight line in FIG. 2 was drawn based on a lower-limit value of the following equation (1):

$$L \geq -1.0\epsilon + 90 \tag{1}$$

Figure 3:
FIG. 3 is an electron microscope photograph of a silicon carbide porous body of Example 1 of the present invention.
Figure 4:
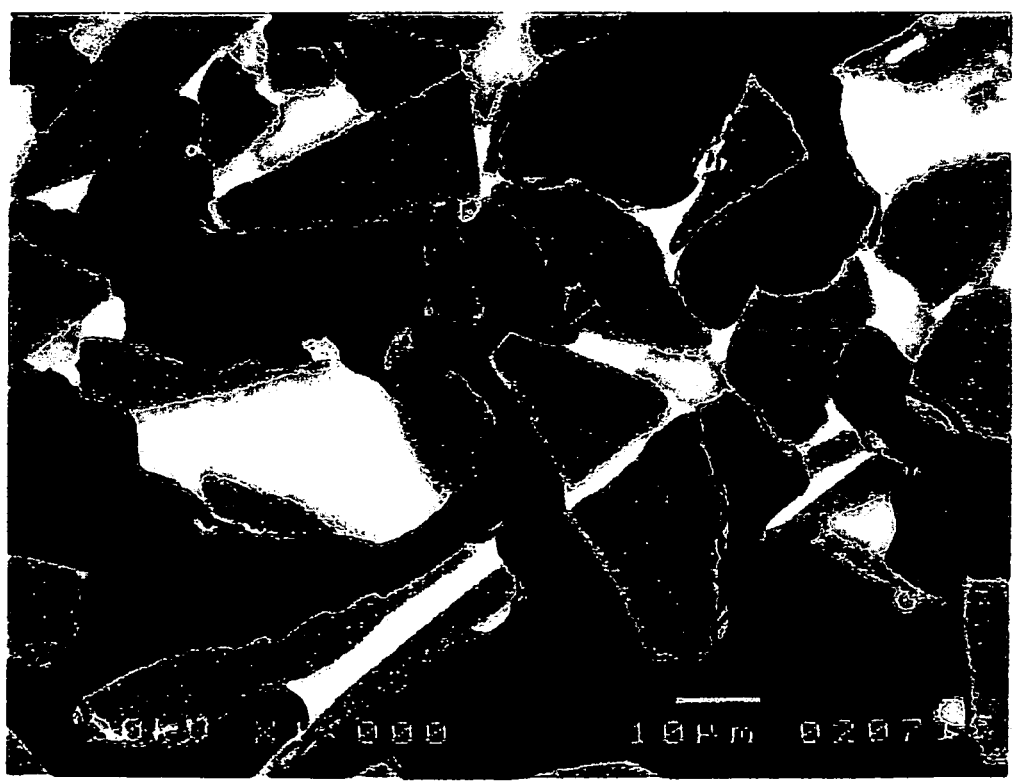
FIG. 4 is an electron microscope photograph of a silicon carbide porous body of Example 2 of the present invention.

Moreover, a ratio (%) (hereinafter sometimes referred to as the oxide bonding ratio (%)) of a total area of portions with which the silicon carbide particles and oxide phase were brought into contact was calculated with respect to a total area of portions with which the silicon carbide particles, metallic silicon, and oxide phase were brought into contact by computer image analysis of the cut face of the silicon carbide porous body photographed using a scanning electron microscope (SEM) or the like. In the present examples and comparative examples, a length (interface length) of a boundary line between the silicon carbide particle and metallic silicon, and that (interface length) of the boundary line between the silicon carbide particle and oxide phase were calculated using an image analysis method similar to the above-described image analysis method. A ratio of a total interface length between the silicon carbide particle and the oxide phase was calculated with respect to a total interface length of the silicon carbide particle with respect to metallic silicon and oxide phase to obtain an oxide phase bonding ratio. Results are shown in Table 1. An electron microscope photograph of the silicon carbide porous body of Example 1 is shown in FIG. 3, and an electron microscope photograph of the silicon carbide porous body of Example 2 is shown in FIG. 4. It is to be noted that, in the present embodiment, Image-Pro Plus (trade name) (manufactured by MEDIA CYBERNETICS Co.) was used as application software for performing the above-described computer image analysis, but the present invention is not limited to the use of the application software.

Moreover, the porosity (%) of each silicon carbide porous body was measured by Archimedes method. Results are shown in Table 1.

Furthermore, in each obtained silicon carbide porous body, strength (four-point bending strength) (MPa) was measured at room temperature in conformity to the measuring method described in JIS R 1601. Results are shown in Table 1.

Additionally, a crystallized state of the oxide phase constituting each silicon carbide porous body was identified by X-ray diffraction. Results are shown in Table 2.

TABLE 2

| | Substance amount (mol %) ratio of oxide ($SrO:Al_2O_3:SiO_2$) | Crystallized state of oxide phase | Mass decrease ratio by acetic acid (mass %) |
|---|---|---|---|
| Example 1 | 1.0:0.2:2.0 | Amorphous | 0 |
| Example 2 | 1.0:0.2:1.3 | Amorphous | 0 |
| Example 3 | 1.0:0.2:2.1 | Amorphous | 0 |
| Comparative Example 1 | 1.0:0.2:1.0 | Amorphous | — |
| Comparative Example 2 | 1.0:0.2:2.0 | Amorphous | — |
| Comparative Example 3 | 1.0:0.06:2.0 | $SrSiO_3$ | 0.8 |
| Comparative Example 4 | 1.0:1.2:2.0 | $SrAl_2Si_2O_8$ | — |
| Comparative Example 5 | 1.0:0.2:0.5 | Amorphous | — |
| Comparative Example 6 | 1.0:0.2:5.0 | Amorphous | — |
| Comparative Example 7 | 1.0:0.2:1.0 | Amorphous | — |

Moreover, each obtained silicon carbide porous body was immersed in 10 mass % of aqueous acetic acid solution for 30 minutes, masses of the silicon carbide porous body before/after immersion were measured, and a mass decrease ratio (mass %) by elution of the oxide phase against acetic acid was calculated in accordance with the following equation (2). Results are shown in Table 2.

$$\text{Mass decrease ratio (mass \%) by acetic acid} = \{(\text{mass before immersion}) - (\text{mass after immersion})\} / (\text{mass before immersion}) \times 100 \quad (2)$$

As shown in Table 1, in Comparative Example 1, since the mass ratio of the oxide phase was small as 0.8 mass %, a micro porosity of 24% indicated that there were many fine pore portions where any oxide phase was not buried. Since the bonding was not sufficiently effectively strengthened between the silicon carbide particles and/or between the silicon carbide particle and metallic silicon (oxide bonding ratio: 5%), the strength of the silicon carbide porous body was only 15 MPa. On the other hand, in Example 1, since the mass ratio of the oxide phase was 1.7% and large, a micro porosity of 17% indicated that there were many fine pore portions where the oxide phase was buried. Moreover, since the wettability of metallic silicon was satisfactory, the strength was 25 MPa and superior. Further in Example 2, since the ratio of the oxide phase was 4.1% and further large, and the micro porosity was 8%, the effect was sufficient (oxide bonding ratio: 35%) that the bonding between the silicon carbide particles and/or between the silicon carbide particle and metallic silicon was reinforced by the oxide phase, and the strength was 40 MPa and superior.

However, in Comparative Example 2, since the mass ratio of the oxide phase was 15.0% and excessively large, firing contraction increased, and the porosity dropped.

Moreover, as shown in Table 2, in Comparative Example 3 in which a ratio of aluminum oxide ($Al_2O_3$) was 0.06 in each substance amount ratio (molar ratio) of the oxide, strontium silicate ($SrSiO_3$) easily soluble to acetic acid or the like was generated by strontium oxide (SrO) and silicon dioxide ($SiO_2$) contained in the oxide phase, and accordingly a mass decrease ratio (mass %) by acetic acid increased. In Examples 1 and 2, the oxide phase became amorphous by aluminum oxide ($Al_2O_3$), and strontium silicate described above was prevented from being generated. Further in Comparative Example 4 in which the ratio of aluminum oxide ($Al_2O_3$) was 1.2 in each substance amount ratio (molar ratio) of oxide, the wettability of metallic silicon dropped for an uncertain reason, and the strength was only 18 MPa.

Moreover, in Comparative Example 5 in which the ratio of silicon dioxide ($SiO_2$) is 0.5 in each substance amount ratio (molar ratio) of oxide, the eutectic point of the oxide phase could not be sufficiently lowered, and it was not possible to sufficiently lower the viscosity of a molten compound, or an oxide film with which the surface of the silicon carbide particle and/or metallic silicon was coated. Therefore, the wettability of metallic silicon was bad, further the molten oxide phase could not sufficiently enter between the silicon carbide particles and/or between the silicon carbide particle and metallic silicon, and the strength of the silicon carbide porous body was only 16 MPa. Similarly in Comparative Example 6 in which the ratio of silicon dioxide ($SiO_2$) is 5.0 in each substance amount ratio (molar ratio) of oxide, the eutectic point of the oxide phase could not be sufficiently lowered, it was not possible to sufficiently lower the viscosity of the molten compound, or the oxide film with which the surface of the silicon carbide particle and/or metallic silicon was coated, and therefore the strength of the silicon carbide porous body was only 18 MPa.

Furthermore, as shown in Table 1, in Comparative Example 7 in which a pore former was used in order to reduce the pressure loss, the porosity was enhanced, but the strength largely dropped (9 MPa), and it was difficult to preferably use the example, for example, as a material constituting a filter, a catalyst carrier or the like for automobile exhaust gas purification. On the other hand, in Example 3 in which the porosity was similarly enhanced, as compared with Comparative Example 7, the ratio of the oxide phase was 5.8% and very large, and the micro porosity was 9%. Therefore, since the effect was sufficient (oxide bonding ratio: 38%) that the bonding was strengthened between the silicon carbide particles and/or between the silicon carbide particle and metallic silicon by the oxide phase. Therefore, although the porosity was 59% and very high, the strength was 18 MPa, and remarkably superior, and the example was usable, for example, as the material constituting the filter, catalyst carrier or the like for the automobile exhaust gas purification.

Additionally, as shown in FIG. 2, Examples 1 to 3 have superior strengths as the constituting materials of the DPF in order to sufficiently satisfy the equation (1).

INDUSTRIAL APPLICABILITY

As described above, a silicon carbide porous body of the present invention, and a honeycomb structure comprising the silicon carbide porous body have high mechanical strength, and are preferably usable as materials constituting a filter, a catalyst carrier or the like for automobile exhaust gas purification. A process for producing the silicon carbide porous body of the present invention is capable of simply and inexpensively producing the silicon carbide porous body.

The invention claimed is:
1. A silicon carbide porous body comprising silicon carbide particles which are aggregates and metallic silicon which is a bonding material, bonded together in such a manner that pores are retained between the silicon carbide particles and/or between the silicon carbide particle and metallic silicon, wherein an amorphous oxide phase containing oxides of silicon, aluminum, and strontium (SrO:Al$_2$O$_3$:SiO$_2$) in a ratio of (1.0:0.1:1.0) to (1.0:1.0:3.0) in terms of amount ratio (molar ratio) of each substance is buried in at least some of fine pore portions having a minimum distance of 10 μm or less between the surfaces of the silicon carbide particles or between the surfaces of the silicon carbide particle and metallic silicon among the pores, and a ratio of a total volume (pore volume of the fine pore portion) of portions in which the oxide phase is not buried among the fine pore portions is 20% or less with respect to a total volume (total pore volume) of portions in which the oxide phase is not buried among the pores including the fine pore portions.

2. The silicon carbide porous body according to claim 1, wherein a plane image obtained by photographing a cut face of the silicon carbide porous body cut with a predetermined plane is subjected to an image analysis process, and divided into a specified pore portion originating from the portion in which the oxide phase is not buried in the pore including the fine pore portion, a specified silicon carbide particle portion originating from the silicon carbide particle, a specified metallic silicon portion originating from metallic silicon, and a specified oxide phase portion originating from the oxide phase, and a relation of the following equation (1) is satisfied by a total length (contact length) L (mm/mm$^2$) per unit area (1 mm$^2$) of a portion with which the silicon carbide particle portion, the metallic silicon portion, and the oxide phase portion are brought into contact on the divided plane image, and a porosity ε (%) of the silicon carbide porous body:

$$L \geq -1.0\epsilon + 90 \tag{1}.$$

3. The silicon carbide porous body according to claim 1, wherein a ratio of a total area of portions with which the silicon carbide particle and the oxide phase are brought into contact is in a range of 10 to 70% with respect to a total area of portions with which the silicon carbide particle, metallic silicon, and oxide phase are brought into contact.

4. The silicon carbide porous body according to claim 3, wherein the ratio of the total area of the portions with which the silicon carbide particle and the oxide phase are brought into contact is in a range of 25 to 50% with respect to the total area of the portions with which the silicon carbide particle, metallic silicon, and oxide phase are brought into contact.

5. The silicon carbide porous body according to claim 1, wherein melting temperatures of the amorphous oxides (SrO, Al$_2$O$_3$, SiO$_2$) are in a range of 1000 to 1400° C.

6. The silicon carbide porous body according to claim 5, wherein melting viscosity of the oxide phase is lower than that of metallic silicon.

7. The silicon carbide porous body according to claim 5, wherein a ratio of mass of the oxide phase is in a range of 1.0 to 10.0 mass % with respect to a total mass of the silicon carbide particle and metallic silicon.

8. The silicon carbide porous body according to claim 7, wherein a ratio of mass of the oxide phase is in a range of 4.0 to 8.0 mass % with respect to a total mass of the silicon carbide particle and metallic silicon.

9. A honeycomb structure comprising: the silicon carbide porous body according to claim 1.

10. A process for producing a silicon carbide porous body, comprising: adding, to silicon carbide particles and metallic silicon, compound containing strontium, aluminum, and silicon in a range of 1.0 to 10.0 parts by mass in terms of oxides (SrO, Al$_2$O$_3$, SiO2) with respect to a total of 100 parts by mass of the silicon carbide particles and metallic silicon by adjusting a type and/or an adding amount of the compound containing strontium, aluminum, and silicon in such a manner that a content ratio (SrO:Al$_2$O$_3$:SiO$_2$) of the oxides of strontium, aluminum, and silicon being contained in an amorphous oxide phase constituting at least a part of the porous body having a porous structure obtained by firing in a range of (1.0:0.1:1.0) to (1.0:1.0:3.0) in each substance amount ratio (molar ratio) to obtain a raw material; forming the obtained raw material into a predetermined shape to obtain a formed article; degreasing and thereafter firing the obtained formed article; and burying an amorphous oxide phase containing the respective oxides of silicon, aluminum, and strontium in at least some of fine pore portion having a minimum distance of 10 μm or less between the surfaces of the respective silicon carbide particles or between the surfaces of the silicon carbide particle and metallic silicon among the pores formed between the silicon carbide particles in such a manner that a ratio of a total volume (pore volume of the fine pore portion) of portions in which the oxide phase is not buried among the fine pore portions is 20% or less with respect to a total volume (total pore volume) of portions in which the oxide phase is not buried among the pores including the fine pore portions to obtain the porous body having a porous structure.

11. The process for producing the silicon carbide porous body according to claim 10, wherein an amount of the compound to be added to the silicon carbide particles and metallic silicon and containing strontium, aluminum, and silicon, converted into the respective oxides (SrO, Al$_2$O$_3$, SiO$_2$), is set to a range of 4.0 to 8.0 parts by mass with respect to a total amount of 100 parts by mass of the silicon carbide particles and metallic silicon.

12. The silicon carbide porous body according to claim 2, wherein a ratio of a total area of portions with which the silicon carbide particle and the oxide phase are brought into contact is in a range of 10 to 70% with respect to a total area of portions with which the silicon carbide particle, metallic silicon, and oxide phase are brought into contact.

13. The honeycomb structure according to claim 9, wherein a plane image obtained by photographing a cut face of the honeycomb structure cut with a predetermined plane is subjected to an image analysis process, and divided into a specified pore portion originating from the portion in which the oxide phase is not buried in the pore including the fine pore portion, a specified silicon carbide particle portion originating from the silicon carbide particle, a specified metallic silicon portion originating from metallic silicon, and a specified oxide phase portion originating from the oxide phase, and a relation of the following equation (1) is satisfied by a total length (contact length) L (mm/mm$^2$) per unit area (1 mm$^2$) of a portion with which the silicon carbide particle portion, the metallic silicon portion, and the oxide phase portion are brought into contact on the divided plane image, and a porosity ε (%) of the silicon carbide porous body:

$$L \geq -1.0\epsilon + 90 \tag{1}.$$

\* \* \* \* \*